United States Patent
Illmeier

Patent Number: 6,056,658
Date of Patent: May 2, 2000

[54] POWER TRAIN FOR A VEHICLE

[75] Inventor: Ferry Illmeier, Graz, Austria

[73] Assignee: Steyr-Daimler-Puch Fahrzeugtechnik AG & Co.K.G., Vienna, Austria

[21] Appl. No.: 09/200,336

[22] Filed: Nov. 25, 1998

[30] Foreign Application Priority Data

Nov. 25, 1997 [AT] Austria ................. 1995/97

[51] Int. Cl.$^7$ ................................ F16H 48/22
[52] U.S. Cl. ............................................. 475/88
[58] Field of Search ................................. 475/88

[56] References Cited

U.S. PATENT DOCUMENTS

| | | | |
|---|---|---|---|
| 3,923,113 | 12/1975 | Padgin ......................... | 180/44 |
| 4,091,901 | 5/1978 | Geppert ....................... | 192/61 |
| 4,727,966 | 3/1988 | Hiramatsu et al. ........... | 192/0.033 |
| 4,730,514 | 3/1988 | Shikata et al. ............... | 74/711 |
| 5,536,215 | 7/1996 | Shaffer et al. ............... | 475/88 |
| 5,595,214 | 1/1997 | Shaffer et al. ............... | 137/517 |
| 5,611,746 | 3/1997 | Shaffer .......................... | 475/88 |
| 5,709,627 | 1/1998 | Teraoka ......................... | 475/88 |
| 5,749,801 | 5/1998 | Teraoka et al. .............. | 475/88 |
| 5,888,163 | 3/1999 | Shaffer et al. ............... | 475/88 |

*Primary Examiner*—Dirk Wright
*Attorney, Agent, or Firm*—Karl Hormann

[57] ABSTRACT

An automotive drive unit provided with a rotatably driveable input shaft and at least one output shaft driven by the input shaft, a hydraulic clutch responsive to differences in rotation between the input and output shafts and provided with a hydrostatic displacement pump which at the occurrence of such a difference generates pressure for reducing the difference. The pressure fluid is drawn by the pump from a stationary reservoir into a suction chamber by way of a suction tube. In order to minimize the structural complexity of the drive unit and to provide a precise and quickly responsive control, the suction chamber is limited by a wall integral with the housing of the drive unit, and the suction tube is provided with a selectively controllable valve.

4 Claims, 1 Drawing Sheet

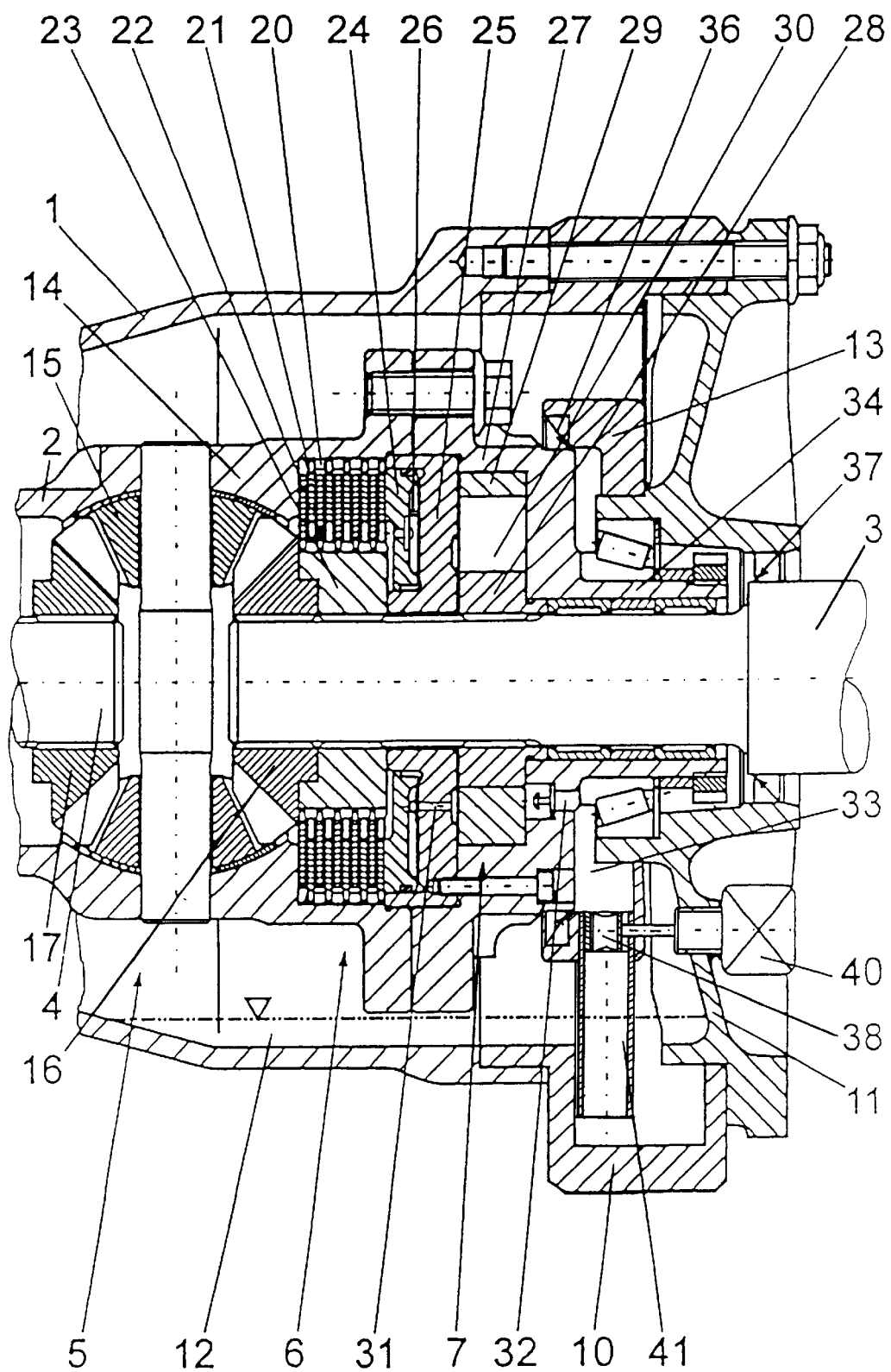

POWER TRAIN FOR A VEHICLE

BACKGROUND OF THE INVENTION

1. Field of the Invention

The invention, in general, relates to a power train for automotive vehicles and, more particularly, to a drive unit thereof provided with an input shaft and at least one output shaft in which a hydrostatic displacement engine connected to a stationary fluid reservoir by a suction tube generates pressure for reducing any differences in rotation s between the input and output shafts by actuating a hydraulic coupling.

2. The Prior Art

Many different drive units of the general kind have become known. They differ from each other in their construction as well as in the way in which they function to reduce the difference in rotations. For instance, U.S. Pat. Nos. 5,611,746; 5,595,214 and 5,536,215 disclose trochoidal pumps. U.S. Pat. Nos. 4,091,901; 4,727,966 and 3,923,113 teach gear pumps; and the apparatus disclosed by U.S. Pat. No. 4,730,514 makes use of a vane pump. Accordingly, they are each equipped with an appropriately structured pair of components which are movable relative to each other.

In every instant, pressure is generated whenever there is a difference in rotation between those two components which reduces the difference either by way of a friction clutch as in the case of the embodiments shown in FIGS. 1 and 22 of International Application WO 95/23931 or by impeding the relative movement between the two components as in the embodiment depicted in FIG. 12 of this publication.

Where such a drive unit is equipped with two output shafts, a differential transmission may be provided between them (WO 95/23931 FIGS. 1 and 12) in which the differential effect is blocked by the built-up pressure. But as disclosed by U.S. Pat. No. 4,091,901, a similar effect may be achieved where there is no differential transmission.

Such drive units are used in the power train of automotive vehicles for distributing drive torque to the wheels mounted on one axle, or to two axles, as the case may be. In case one or more wheels loose contact with the driving surface, which results in an increasing difference in rotations, such drive units change the torque distribution such that traction is provided to those wheels only which have not lost surface contact.

Problems inherent in such arrangements stem from rotational differences resulting from circumstances other than the loss of surface contact, such as, for instance, driving in curves, braking, towing or driving with an emergency wheel. The changes in the torque distribution resulting therefrom are similarly undesirable and, in many cases, dangerous. To overcome these problems, it is customary additionally to provide a freewheeling clutch which must, however, be bypassed when driving in reverse, for instance.

U.S. Pat. No. 4,727,966 discloses a drive unit of the kind referred to in which the operating fluid for the displacement pump is pumped from a stationary housing. To control the coupling action and, more particularly, to limit the coupling action as a function of operating parameters, fluidally adjustable pressure-relief valves are provided at the pressure side of the displacement pump. Since the pressure chambers are provided in rotating parts of the displacement pump, actuation of the control members in the rotating parts and the supply of operating fluid thereinto requires a rotating input. Not only does this entail a complex structure, but the control is also prone to malfunction and is inaccurate. Moreover, the responsiveness of a pressure-relief valve leads to a strongly retarded reduction of the coupling action in view of the fact that the high flow rate at high pressure has to be accommodated by the narrow passage of the pressure-relief valve. Hence, the valve constitutes a throttle which does not allow a complete pressure reduction.

OBJECTS OF THE INVENTION

It is, therefore, an object of the invention to provide an apparatus of the kind referred to which is of simple construction.

Another object of the invention is to provide a drive unit of simple construction in which the coupling action may be reduced under precise control.

Yet another object is to provide a drive unit which allows the coupling action to be reduced or even completely eliminated under a quickly responsive control.

BRIEF SUMMARY OF THE INVENTION

In accordance with a currently preferred embodiment of the invention there is provided a fluid reservoir which is at least partially limited by a wall which is an immovable part of a the housing and a suction duct which may be closed by a controlled valve. In this manner, the controlled valve may be stationary. This, in turn, does not only significantly simplify the feeding of the signal or control medium, but it also renders it very much more precise. The signal is generated in a control unit in dependence of predetermined parameters and threshold values.

This arrangement also leads to significant improvements in the operation. Since the displacement pump has to draw in the operating fluid, the supply thereof will very quickly and completely cease when the suction duct is closed. Yet by slow actuation of the valve in the suction tube the supply can also be slowly reduced. As a consequence of the rapid stoppage of the supply the coupling action may be quickly and completely terminated in case of braking, towing or driving with an emergency wheel.

DESCRIPTION OF THE SINGLE DRAWING

The novel features which are considered to be characteristic of the invention are set forth with particularity in the appended claims. The invention itself, however, in respect of its structure, construction and lay-out, as well as manufacturing techniques, together with other objects and advantages thereof, will best be understood from the following description of a preferred embodiment when read with reference to the appended sole drawing, which depicts a drive unit in accordance with the invention in longitudinal section.

DETAILED DESCRIPTION OF THE PREFERRED EMBODIMENT

In the drawing, a stationary housing of a drive unit is identified by reference numeral 1. An input shaft 2 is driven from a source of rotary power (not shown). First and second output shafts 3 and 4 are drivingly connected to a pair of wheels mounted in a well-known manner on an axle of a vehicle (also not shown). The two output shafts 3 and 4 are driven by the input shaft 2 by way of a differential transmission 5 which distributes driving torque between the two output shafts 3, 4 as is well-known in the art. In addition, between the input shaft 2 and the first output shaft 3 there is provided a hydraulic coupling which is responsive to differences in rotations between those shafts. The hydraulic coupling is made up of a multiple disk clutch 6 and a displacement pump 7.

The housing 1 is only shown schematically. It is bolted to an annular sump 10 and a bearing plate 11. In the housing 1, there is provided an oil sump 12 to be described below. Inwardly of the bearing plate 11 there is seated a sealing support ring 13. The differential transmission 5 includes a housing 14, differential gears 15 and their shaft, a first output bevel gear 16 rigidly connected to the first output shaft 3 and a second output bevel gear 17 which is rigidly connected to the second output shaft 4.

The multidisc clutch 6 is also mounted in the differential housing 14 in the interior of which there are provided spline teeth 20 and outer clutch discs 21 mounted for rotation therewith and axially movable relative thereto. Furthermore, inner clutch discs 22 are mounted on an inner clutch element 23 for rotation therewith. The inner clutch element 23 is rigidly connected to the first output bevel gear 16 for rotation therewith. Furthermore, the multidisc clutch 6 is provided with a piston 24 which not only exerts pressure on the discs 21, 22 but which together with an intermediate wall 25 mounted in the differential housing 14 also forms a pressure chamber 26.

The displacement pump 7 is provided in a pump casing 27 bolted to the differential housing 14. Basically, the displacement pump 7 consists of an internal rotor 28 mounted on the first output shaft 3 for rotation therewith and of an eccentric outer rotor 29 which may be rotated in the pump casing 27. A working chamber 30 is formed between the two rotors 28, 29. The configuration of the chamber 30 is determined by the structure of the displacement pump. Any of the known displacement pumps structured as described super may be utilized in the context of the present invention. A pressure duct 31 leads from the working chamber 30 to the pressure chamber 26 of the multidisc clutch 6. Depending up o n the particular construction of the displacement pump more than one pressure duct with appropriate self-controlled devices may be provided.

In the pump casing 27 there is provided at least one suction duct 32 with appropriate self-controlled valves for connecting the working chamber 30 of the displacement pump to a suction chamber 33. Adjacent to its axis the pump casing 27 is provided with an axially extending bearing sleeve 34 for supporting the unit consisting of the differential transmission 5, multidisc clutch 6 and displacement pump 7. Those skilled in the art will understand that another bearing (not shown) is provided at the opposite end of the unit.

A first sealing ring 36 is seated in the stationary sealing support ring 13 and provides a seal between the stationary housing 1 and the rotating pump casing 27. The suction chamber 33 is sealed by a second sealing ring 37 seated between the housing and the first output shaft 3. The suction chamber 33 is thus enclosed by the rotating pump casing 27 and bearing sleeve 34 and by the stationary bearing plate 11 and sealing support ring 13. Hence, the suction chamber 33 is a hermetically sealed chamber. A suction tube 41 is sealingly connected to the lower portion of the sealing support ring 13 and connects the suction chamber 33 with the oil sump 12 from which the displacement pump 7 draws its operating medium. The suction tube 41 may be closed by a controllable valve 38 which is energized by a solenoid 40 connected via a signal line to a control unit of the vehicle (neither shown).

The unit operates as follows: As long as the two output shafts 3, 4 as well as the input shaft 2 rotate at the same speed there will be no difference in rotation between them. If, however, as a result of lost surface contact one of the two output shafts 3, 4 begins to rotate faster than the other shaft, a difference in rotation will result between the discs 21, 22 of the multidisc clutch 6 and between the rotors 28, 29 of the displacement pump 7. This leads to a build-up of pressure within the displacement pump which acts upon the piston 24 of the multidisc clutch 6 to close it substantially in proportion to the difference in rotations, provided the pressure has not been set by a control valve in the piston. This leads to a gradual locking of the differential. If, however, a difference in rotations notwithstanding, the differential is not to be locked, as, for instance, in the case of abrupt braking or of driving with an emergency wheel, the controlled valve 38 will be closed by way of the solenoid 40 to block the supply of operating medium, i.e. oil, from the sump 12. Hence, the drawing of operating medium will cease instantly and the pumping action of the displacement pump 7, as well as the locking action, will terminate almost instantly if the valve 38 is closed abruptly and completely. In the same manner it is possible to prevent any build-up of pressure and the engagement of the multidisc clutch or to adjust the action of the displacement pump 7 to the state of driving in case of an existing difference in rotations, by slowly or partially opening the valve 38.

It will be appreciated that the invention is not limited to the embodiment disclosed herein. It may be practiced in connection with any of the known arrangements and kinds of displacement pumps referred to, in particular where there is no multidisc clutch and coupling connection is established by the rotors 28, 29 by closure of their operating chamber 30.

Having described my invention, what I claim is:

1. An automotive drive unit, comprising:
   an input shaft (2) adapted to be rotated at a predetermined speed;
   at least one output shaft (3) drivingly connected to the input shaft (2);
   a clutch (6) comprising first and second members (21,22) respectively mounted on said input and output shafts (2,3) and a piston (24) for moving the first and second members (21,22) between a first position in which they can rotate relative to each other and a second position in which they brakingly engage each other;
   a displacement pump (7) comprising a chamber (30) for pumping fluid from a stationary reservoir (12,33) to the piston (24), the chamber (30) being formed by first and second members (28,29) respectively connected to the input and output shafts (2,3) and moving relative to each other in response to a difference in rotation between the input and output shafts (2, 3) thereby to generate pressure to actuate the piston (24) for moving the first and second members (21, 22) between their first and second positions; and
   a duct (32,33,40) for connecting the chamber (30) to the reservoir (12) and comprising a selectively actuable valve (38) for controlling the rate of fluid flow from the reservoir (12) to the chamber (30) to control the movement of the piston (24).

2. The automative drive unit of claim 1, wherein the input and output shafts (2, 3) are connected to each other by a differential transmission (5) and wherein the pressure is increased in response to the rotations of the output shaft (3) exceeding the rotations of the input shaft (2).

3. An automotive drive unit, comprising:
   an input shaft adapted to be rotated at a predetermined speed;
   at least one output shaft;
   a hydraulic clutch selectively engageable for connecting the input shaft to the output shaft;
   a displacement pump connected to a fluid sump and responsive to differences in rotation between the input shaft and the output shaft by generating fluid pressure to engage the clutch; and
   a selectively actuable valve for controlling the connection between the pump and the fluid sump to control the fluid pressure and the force of engagement of the clutch.

4. The automotive drive unit of claim 3, wherein the clutch comprises first and second discs respectively connected to the input shaft and the ouptut shaft for rotation therewith and a fluid operated pision responsive to the fluid pressure for moving the first and second discs relative to each other for controlling the force of engagement of the clutch and the difference of rotation between the input shaft and the output shaft.

* * * * *